United States Patent
Xia et al.

(10) Patent No.: US 10,548,120 B2
(45) Date of Patent: Jan. 28, 2020

(54) INFORMATION ACQUIRING METHOD, TERMINAL, BASE STATION, AND SYSTEM

(71) Applicant: Huawei Technologies Co., Ltd., Shenzhen (CN)

(72) Inventors: Jinhuan Xia, Beijing (CN); Brian Classon, Court Palatine, IL (US); Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 407 days.

(21) Appl. No.: 15/068,410

(22) Filed: Mar. 11, 2016

(65) Prior Publication Data

US 2016/0198441 A1 Jul. 7, 2016

Related U.S. Application Data

(63) Continuation of application No. PCT/CN2013/083403, filed on Sep. 12, 2013.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01); *H04L 5/0091* (2013.01); *Y02D 70/00* (2018.01)

(58) Field of Classification Search
CPC ...... H04W 72/042; H04W 4/02; Y02D 70/00; H04L 5/003; H04L 5/0048; H04L 5/0091
See application file for complete search history.

(56) References Cited

U.S. PATENT DOCUMENTS

| | | | | |
|---|---|---|---|---|
| 8,223,854 B2* | 7/2012 | Ghosh | ................. | H04L 1/0068 375/260 |
| 8,619,889 B2* | 12/2013 | Ghosh | ................. | H04L 1/0068 375/260 |

(Continued)

FOREIGN PATENT DOCUMENTS

| CN | 101217778 A | 7/2008 |
|---|---|---|
| CN | 101483903 A | 7/2009 |

(Continued)

OTHER PUBLICATIONS

R1-132971, titled "Coverage enhancement for PRACH", (R1-132971 hereinafter) was published as Agenda item: 7.2.4.2, having been Sourced by: Alcatel-Lucent, Alcatel-Lucent Shanghai Bell, during 3GPP TSG-RAN WG1 Meeting #74 R1-132971 in Barcelona, Spain, Aug. 19-23, 2013, pp. 01-03.*

(Continued)

*Primary Examiner* — Zhiren Qin
(74) *Attorney, Agent, or Firm* — Slater Matsil, LLP

(57) ABSTRACT

The present invention discloses an information acquiring method, including: acquiring initial information according to at least one preset resource set, where the at least one resource set is used to indicate a resource used to acquire the initial information. In the information acquiring method according to embodiments of the present invention, a terminal may receive the initial information by using a preset resource set without a need to detect a widest scope of resources, thereby improving receiving efficiency of the terminal, and further reducing power consumption of the terminal.

14 Claims, 5 Drawing Sheets

(56) References Cited

U.S. PATENT DOCUMENTS

| | | | |
|---|---|---|---|
| 10,098,107 B2* | 10/2018 | Ko | H04L 5/0053 |
| 2009/0086671 A1* | 4/2009 | Pelletier | H04W 72/12 |
| | | | 370/329 |
| 2010/0080265 A1* | 4/2010 | Moffatt | H04L 5/0007 |
| | | | 375/135 |
| 2010/0278132 A1 | 11/2010 | Palanki et al. | |
| 2011/0235601 A1* | 9/2011 | Yoo | H04L 5/0053 |
| | | | 370/329 |
| 2012/0093059 A1* | 4/2012 | Bai | H04L 5/0007 |
| | | | 370/312 |
| 2012/0250620 A1 | 10/2012 | Hu | |
| 2012/0257553 A1* | 10/2012 | Noh | H04J 11/0053 |
| | | | 370/280 |
| 2012/0257689 A1* | 10/2012 | Hong | H04L 1/0067 |
| | | | 375/295 |
| 2013/0044685 A1* | 2/2013 | Fong | H04J 11/0053 |
| | | | 370/328 |
| 2013/0128826 A1* | 5/2013 | Lin | H04L 1/1861 |
| | | | 370/329 |
| 2013/0136101 A1* | 5/2013 | Guo | H04W 28/18 |
| | | | 370/330 |
| 2013/0170463 A1* | 7/2013 | Yang | H04L 1/1861 |
| | | | 370/329 |
| 2013/0183987 A1* | 7/2013 | Vrzic | H04L 5/0053 |
| | | | 455/450 |
| 2013/0188590 A1* | 7/2013 | Aiba | H04L 1/1861 |
| | | | 370/329 |
| 2013/0288694 A1* | 10/2013 | Mochizuki | H04W 72/04 |
| | | | 455/450 |
| 2014/0126508 A1* | 5/2014 | Young | H04L 5/0053 |
| | | | 370/329 |
| 2014/0301353 A1* | 10/2014 | Frenne | H04L 5/003 |
| | | | 370/330 |
| 2014/0302867 A1* | 10/2014 | Mizusawa | H04W 16/16 |
| | | | 455/452.1 |
| 2014/0307697 A1* | 10/2014 | Beale | H04L 5/0044 |
| | | | 370/329 |
| 2014/0321399 A1* | 10/2014 | Liu | H04W 72/042 |
| | | | 370/329 |
| 2015/0131549 A1* | 5/2015 | Lu | H04W 88/10 |
| | | | 370/329 |
| 2015/0319776 A1* | 11/2015 | Seo | H04W 74/002 |
| | | | 370/329 |
| 2016/0164653 A1* | 6/2016 | Wang | H04L 5/0048 |
| | | | 370/329 |
| 2016/0198441 A1* | 7/2016 | Xia | H04W 72/042 |
| | | | 370/329 |

FOREIGN PATENT DOCUMENTS

| | | |
|---|---|---|
| CN | 101827395 A | 9/2010 |
| CN | 101931961 A | 12/2010 |
| CN | 102026375 A | 4/2011 |
| CN | 102036250 A | 4/2011 |
| CN | 102215547 A | 10/2011 |
| CN | 102378129 A | 3/2012 |
| CN | 102422669 A | 4/2012 |
| WO | WO2013104305 A1 * | 7/2013 |

OTHER PUBLICATIONS

R1-132973, titled "Coverage enhancement for (E)PDCCH", (R1-132973 hereinafter) was published as Agenda item: 7.2.4.2, having been Sourced by: Alcatel-Lucent, Alcatel-Lucent Shanghai Bell, during 3GPP TSG-RAN WG1 Meeting #74 R1-132973 in Barcelona, Spain, Aug. 19-23, 2013, pp. 01-03.*

R1-133063, titled "Physical Random Access Channel Coverage Enhancement", (R1-133063 hereinafter) was published as Agenda item: 7.2.4.2, having been Sourced by: ZTE, during 3GPP TSG-RAN WG1 Meeting #74 R1-133063 in Barcelona, Spain, Aug. 19-23, 2013, pp. 01-08.*

3GPP TS 36.331 V11.4.0 (Jun. 2013), Title: "3rd Generation Partnership Project; Technical Specification Group Radio Access Network; Evolved Universal Terrestrial Radio Access (E-UTRA); Radio Resource Control (RRC); Protocol specification (Release 11 )", Publication-Date: Jun. 2013.*

R1-132972, titled "Coverage enhancement for PBCH", (R1-132972 hereinafter) was published as Agenda item: 7.2.4.2, having been Sourced by: Alcatel-Lucent, Alcatel-Lucent Shanghai Bell, during 3GPP TSG-RAN WG1 Meeting #74 R1-132972 in Barcelona, Spain, Aug. 19-23, 2013, pp. 01-03.*

3rd Generation Partnership Project; Technical Specification Group Radio Access Network; Evolved Universal Terrestrial Radio Access (E-UTRA); Physical Channels and Modulation (Release 11); 3GPP TS 36.211 V11.3.0 (Jun. 2013), 108 pages.

Prabhu, P., "What is MIB in LTE?," Long Term Evolution 4G, https://ltebasics.wordpress.com/2013/07/03/what-is-mib-in-lte/; Jul. 3, 2013, 11 pages.

* cited by examiner

INFORMATION ACQUIRING METHOD, TERMINAL, BASE STATION, AND SYSTEM

This application is a continuation of International Application No. PCT/CN 2013/083403, filed on Sep. 12, 2013, which is hereby incorporated by reference in its entirety.

TECHNICAL FIELD

The present invention relates to the field of communications technologies, and in particular, to an information acquiring method, a terminal, a base station, and a system.

BACKGROUND

Before accessing a network, a terminal needs to receive initial information sent by a base station, where the initial information includes system information. The system information includes: a master information block (MIB), a system information block (SIB), and the like, where the MIB is carried over a physical broadcast channel (PBCH). The system information is information necessary for the terminal to communicate with the base station before the terminal accesses the network. For ease of description, unless specially stated, the system information mentioned in solutions of the present invention may include a master information block or a system information block, or include both a master information block and a system information block.

In a coverage enhancement scenario, to enable the terminal to receive the system information sent by the base station, the base station repeatedly sends the system information to the terminal, and the terminal performs joint receiving, so as to meet a requirement that the terminal may correctly receive the system information.

The prior art has the following disadvantage: to ensure that terminals of different receiving capabilities can correctly receive the system information, even if coverage enhancement capabilities or requirements requested by different cells are different, the base station uses a widest scope of resources to send the system information to the terminals, and the terminals receive the system information by using the widest scope of resources. Actually, not all the terminals have a lowest receiving capability, and therefore such a processing manner in the prior art causes a low resource utilization rate.

SUMMARY

Embodiments of the present invention provide an information acquiring method, which can improve receiving efficiency of a terminal while ensuring that the terminal correctly receives initial information sent by a base station. The embodiments of the present invention further provide a corresponding terminal, base station, and system.

A first aspect of the present invention provides an information acquiring method, including:

acquiring initial information according to at least one preset resource set, where the at least one resource set is used to indicate a resource used to acquire the initial information.

With reference to the first aspect, in a first possible implementation manner, the method further includes:

parsing the initial information; and when determining information of a resource set used by a base station to send the initial information is included in the initial information, determining, according to the determining information, the resource set used by the base station to send the initial information.

With reference to the first aspect or the first possible implementation manner of the first aspect, in a second possible implementation manner, the method further includes:

determining, according to the resource set used to send the initial information, a resource used to receive non-initial information, where the non-initial information is information that needs to be received after a terminal completes acquiring the initial information; and receiving the non-initial information by using the resource used to receive the non-initial information.

With reference to the second possible implementation manner of the first aspect, in a third possible implementation manner, the determining, according to the resource set used to send the initial information, a resource used to receive non-initial information includes:

excluding resources indicated by all resource sets used to send the initial information, and determining a remaining resource obtained after the exclusion as a resource used to receive the non-initial information.

With reference to the second possible implementation manner of the first aspect, in a fourth possible implementation manner, the determining, according to the resource set used to send the initial information, a resource used to receive non-initial information includes:

excluding a resource indicated by the resource set indicated by the determining information, and determining a remaining resource obtained after the exclusion as a resource used to receive the non-initial information.

With reference to the third or the fourth possible implementation manner of the first aspect, in a fifth possible implementation manner, the receiving the non-initial information by using the resource used to receive the non-initial information includes:

receiving the non-initial information by using the remaining resource according to a puncturing algorithm or a rate matching algorithm.

With reference to the first aspect, or any one of the first to the fifth possible implementation manners of the first aspect, in a sixth possible implementation manner, the initial information is information necessary for accessing a network to perform communication; and the initial information includes at least one of a master information block MIB carried over a physical broadcast channel PBCH, and a system information block SIB.

With reference to the first aspect, or any one of the first to the sixth possible implementation manners of the first aspect, in a seventh possible implementation manner, the non-initial information includes at least one of information carried over a physical downlink control channel PDCCH, information carried over an enhanced physical downlink control channel EPDCCH, information carried over a physical downlink shared channel PDSCH, and a channel state information-reference signal CSI-RS.

With reference to the first aspect, or any one of the first to the seventh possible implementation manners of the first aspect, in an eighth possible implementation manner, each resource set of the at least one resource set includes indication information of at least one of a time-domain resource and a frequency-domain resource that carry the initial information.

With reference to the eighth possible implementation manner of the first aspect, in a ninth possible implementation manner, each resource set includes indication information of at least one of a time-domain resource and a frequency-domain resource that are of a preset quantity and at a preset position, and resources indicated by the at least one resource set do not overlap, or partially overlap.

With reference to the eighth possible implementation manner of the first aspect, in a tenth possible implementation manner, each resource set includes indication information of at least one of a time-domain resource and a frequency-domain resource that are of a same quantity and at a preset position, and resources indicated by the at least one resource set do not overlap, or partially overlap.

With reference to the eighth possible implementation manner of the first aspect, in an eleventh possible implementation manner, the resources indicated by the at least one resource set are in an inclusion relationship, and after the at least one resource set is sorted in ascending order of a quantity of indicated resources, resources indicated by a current resource set always include all resources indicated by a previous resource set.

With reference to the first aspect, or any one of the first to the eleventh possible implementation manners of the first aspect, in a twelfth possible implementation manner, when each resource set of the at least one resource set indicates that resource elements REs that carry the initial information are of a same quantity and at same positions in radio frames of each resource set, the acquiring initial information according to at least one preset resource set includes:

acquiring the initial information by using the resource elements REs that are of the same quantity and at the same positions in the radio frames of each resource set.

A second aspect of the present invention provides an information acquiring method, including:

sending initial information according to at least one preset resource set, where the at least one resource set is used to indicate a resource used to send the initial information.

With reference to the second aspect, in a first possible implementation manner, determining information of a resource set used to send the initial information is included in the initial information, so that a terminal determines, according to the determining information, a resource set used by a base station to send the initial information.

With reference to the second aspect or the first possible implementation manner of the second aspect, in a second possible implementation manner, the method further includes:

determining, according to the resource set used to send the initial information, a resource used to send non-initial information, where the non-initial information is information that needs to be sent after the initial information is sent; and sending the non-initial information by using the resource used to send the non-initial information.

With reference to the second possible implementation manner of the second aspect, in a third possible implementation manner, the determining, according to the resource set used to send the initial information, a resource used to send non-initial information includes:

excluding resources indicated by all resource sets used to send the initial information, and determining a remaining resource obtained after the exclusion as a resource used to send the non-initial information.

With reference to the second possible implementation manner of the second aspect, in a fourth possible implementation manner, the determining, according to the resource set used to send the initial information, a resource used to send non-initial information includes:

excluding a resource indicated by the resource set indicated by the determining information, and determining a remaining resource obtained after the exclusion as a resource used to send the non-initial information.

With reference to the third or the fourth possible implementation manner of the second aspect, in a fifth possible implementation manner, the sending the non-initial information by using the resource used to send the non-initial information includes:

sending, according to a puncturing algorithm or a rate matching algorithm, the non-initial information by using the resource used to send the non-initial information.

With reference to the second aspect, or any one of the first to the fifth possible implementation manners of the second aspect, in a sixth possible implementation manner, the initial information is information necessary for accessing a network to perform communication; and the initial information includes at least one of a master information block MIB carried over a physical broadcast channel PBCH, and a system information block SIB.

With reference to the second aspect, or any one of the first to the sixth possible implementation manners of the second aspect, in a seventh possible implementation manner, the non-initial information includes at least one of information carried over a physical downlink control channel PDCCH, information carried over an enhanced physical downlink control channel EPDCCH, information carried over a physical downlink shared channel PDSCH, and a channel state information-reference signal CSI-RS.

With reference to the second aspect, or any one of the first to the seventh possible implementation manners of the second aspect, in an eighth possible implementation manner, each resource set of the at least one resource set includes indication information of at least one of a time-domain resource and a frequency-domain resource that carry the initial information.

With reference to the eighth possible implementation manner of the second aspect, in a ninth possible implementation manner, each resource set includes indication information of at least one of a time-domain resource and a frequency-domain resource that are of a preset quantity and at a preset position, and resources indicated by the at least one resource set do not overlap, or partially overlap.

With reference to the eighth possible implementation manner of the second aspect, in a tenth possible implementation manner, each resource set includes indication information of at least one of a time-domain resource and a frequency-domain resource that are of a same quantity and at a preset position, and resources indicated by the at least one resource set do not overlap, or partially overlap.

With reference to the eighth possible implementation manner of the second aspect, in an eleventh possible implementation manner, the resources indicated by the at least one resource set are in an inclusion relationship, and after the at least one resource set is sorted in ascending order of a quantity of indicated resources, resources indicated by a current resource set always include all resources indicated by a previous resource set.

With reference to the second aspect, or any one of the first to the eleventh possible implementation manners of the second aspect, in a twelfth possible implementation manner, when each resource set of the at least one resource set indicates that resource elements REs that carry the initial information are of a same quantity and at same positions in radio frames of each resource set, the sending initial information according to at least one preset resource set includes:

mapping the initial information to the resource elements REs that are of the same quantity and at the same positions in the radio frames of each resource set, and sending the initial information to the terminal.

A third aspect of the present invention provides a terminal, including:

an acquiring unit, configured to acquire initial information according to at least one preset resource set, where the at least one resource set is used to indicate a resource used to acquire the initial information.

With reference to the third aspect, in a first possible implementation manner, the terminal further includes:

a parsing unit, configured to parse the initial information; and a first determining unit, configured to: when the parsing unit obtains, by parsing, determining information that is of a resource set used by a base station to send the initial information and that is included in the initial information, determine, according to the determining information, the resource set used by the base station to send the initial information.

With reference to the third aspect or the first possible implementation manner of the third aspect, in a second possible implementation manner, the terminal further includes:

a second determining unit, configured to determine, according to the resource set used to send the initial information, a resource used to receive non-initial information, where the non-initial information is information that needs to be received after the terminal completes acquiring the initial information; and the acquiring unit is further configured to receive the non-initial information by using the resource used to receive the non-initial information.

With reference to the second possible implementation manner of the third aspect, in a third possible implementation manner, the second determining unit is configured to exclude resources indicated by all resource sets used to send the initial information, and determine a remaining resource obtained after the exclusion as a resource used to receive the non-initial information.

With reference to the second possible implementation manner of the third aspect, in a fourth possible implementation manner, the second determining unit is configured to exclude a resource indicated by the resource set indicated by the determining information, and determine a remaining resource obtained after the exclusion as a resource used to receive the non-initial information.

With reference to the third or the fourth possible implementation manner of the third aspect, in a fifth possible implementation manner, the acquiring unit is configured to receive the non-initial information by using the remaining resource according to a puncturing algorithm or a rate matching algorithm.

With reference to any one of the first to the fifth possible implementation manners of the third aspect, in a sixth possible implementation manner, when each resource set of the at least one resource set indicates that resource elements REs that carry the initial information are of a same quantity and at same positions in radio frames of each resource set, the acquiring unit is further configured to acquire the initial information by using the resource elements REs that are of the same quantity and at the same positions in the radio frames of each resource set.

A fourth aspect of the present invention provides a base station, including:

a sending unit, configured to send initial information according to at least one preset resource set, where the at least one resource set is used to indicate a resource used to send the initial information.

With reference to the fourth aspect, in a first possible implementation manner, the base station further includes:

a determining unit, configured to determine, according to the resource set used to send the initial information, a resource used to send non-initial information, where the non-initial information is information that needs to be sent after the initial information is sent; and the sending unit is further configured to send the non-initial information by using the resource that is used to send the non-initial information and determined by the determining unit.

With reference to the first possible implementation manner of the fourth aspect, in a second possible implementation manner, the determining unit is configured to exclude resources indicated by all resource sets used to send the initial information, and determine a remaining resource obtained after the exclusion as a resource used to send the non-initial information.

With reference to the first possible implementation manner of the fourth aspect, in a third possible implementation manner, the determining unit is configured to exclude a resource indicated by a resource set indicated by determining information, and determine a remaining resource obtained after the exclusion as a resource used to send the non-initial information.

With reference to the second or the third possible implementation manner of the fourth aspect, in a fourth possible implementation manner, the sending unit is configured to send, according to a puncturing algorithm or a rate matching algorithm, the non-initial information by using the resource used to send the non-initial information.

With reference to the fourth aspect, or any one of the first to the fourth possible implementation manners of the fourth aspect, in a fifth possible implementation manner, the sending unit is configured to map the initial information to resource elements REs that are of a same quantity and at same positions in radio frames of each resource set, and send the initial information to a terminal.

A fifth aspect of the present invention provides a terminal, including: an input device, an output device, a processor, and a memory, where:

the input device is configured to acquire initial information according to at least one preset resource set, where the at least one resource set is used to indicate a resource used to acquire the initial information.

A sixth aspect of the present invention provides a base station, including: an input device, an output device, a processor, and a memory, where:

the output device is configured to send initial information according to at least one preset resource set, where the at least one resource set is used to indicate a resource used to send the initial information.

A seventh aspect of the present invention provides a communications system, including: a terminal and a base station, where:

the terminal is the terminal described in the foregoing technical solutions; and the base station is the base station described in the foregoing technical solutions.

In the embodiments of the present invention, initial information is acquired according to at least one preset resource set, where the at least one resource set is used to indicate a resource used to acquire the initial information. Compared with the prior art, where a terminal can receive system information only by using a widest scope of resources, the information acquiring method provided in an embodiment of the present invention enables a terminal to receive the initial information by using a preset resource set without a need to detect a widest scope of resources, thereby improving receiving efficiency of the terminal, and further reducing power consumption of the terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION OF ILLUSTRATIVE EMBODIMENTS

Embodiments of the present invention provide an information acquiring method, which can improve receiving efficiency of a terminal while ensuring that the terminal correctly receives initial information sent by a base station. The embodiments of the present invention further provide a corresponding terminal, base station, and system. The method, terminal, base station, and system are separately described below in detail.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
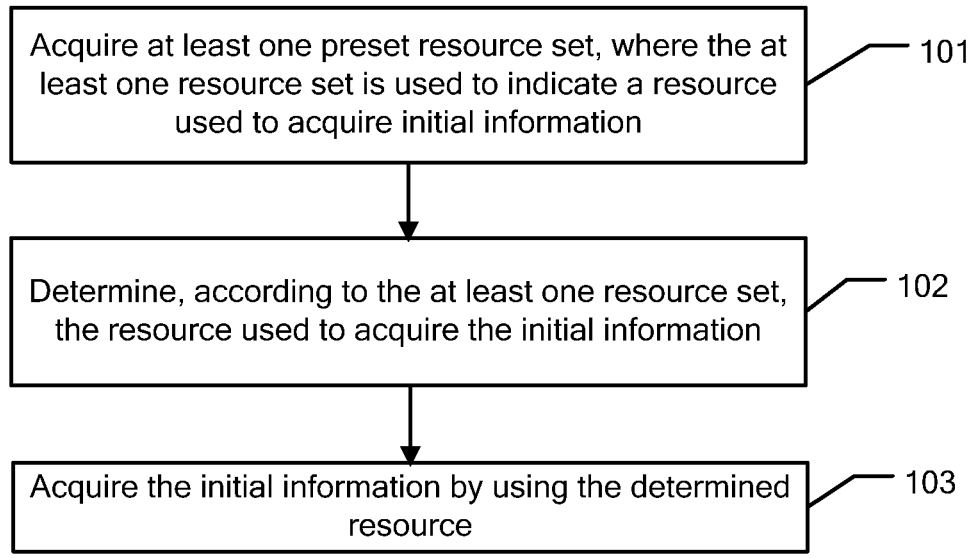
FIG. 1 is a schematic diagram of an information acquiring method according to an embodiment of the present invention.

Referring to FIG. 1, an information acquiring method according to an embodiment of the present invention includes:

acquiring initial information according to at least one preset resource set, where the at least one resource set is used to indicate a resource used to acquire the initial information.

In this embodiment of the present invention, the resource set may include indication information of a resource used to transmit information between a base station and a terminal, so that the terminal may receive the initial information by using a resource indicated by the resource set.

The initial information in this embodiment of the present invention is information necessary for accessing a network to perform communication, and the initial information may include but is not limited to at least one of a master information block (MIB) carried over a physical broadcast channel (PBCH), and a system information block (SIB).

In this embodiment of the present invention, initial information is received according to at least one preset resource set, where the at least one resource set is used to indicate a resource used to receive the initial information. Compared with the prior art, where a terminal can receive system information only by using a widest scope of resources, the information acquiring method provided in this embodiment of the present invention enables a terminal to acquire, according to a requirement of the terminal, initial information by using a resource indicated by a corresponding resource set, thereby improving a resource utilization rate of the terminal.

Referring to FIG. 1, in an optional embodiment of the information acquiring method according to an embodiment of the present invention, a process of the receiving initial information according to at least one preset resource set may include:

101. Acquire the at least one preset resource set, where the at least one resource set is used to indicate a resource used to acquire the initial information.

A process of the acquiring the at least one resource set may be reading or searching for the at least one preset resource set.

102. Determine, according to the at least one resource set, the resource used to acquire the initial information.

A resource set may include indication information of a corresponding resource. For example, when there are two resource sets, a resource set 1 includes identifiers of subframes 1 and 2 of a first radio frame, and a resource set 2 includes the identifiers of the subframes 1 and 2 of the first radio frame and identifiers of subframes 1 and 2 of a second radio frame. In this case, it can be determined that the resources used to receive the initial information are the subframes 1 and 2 of the first radio frame and the subframes 1 and 2 of the second radio frame.

Certainly, only an example is illustrated here, and actually, there may be multiple resource sets, and there may also be multiple types of indication information of resources included in the resource sets. No specific limitation is imposed in this embodiment of the present invention.

103. Acquire the initial information by using the determined resource.

In this embodiment of the present invention, the terminal may receive the initial information by using the resource indicated by the resource set, and does not need to receive the initial information by using a widest scope of resources, thereby improving a resource utilization rate of the terminal.

Optionally, on the basis of the foregoing embodiment, in another optional embodiment of the information acquiring method according to an embodiment of the present invention, the method may further include:

parsing the initial information; and when determining information of a resource set used by a base station to send the initial information is included in the initial information, determining, according to the determining information, the resource set used by the base station to send the initial information.

In this embodiment of the present invention, when sending the initial information, the base station may include, in the initial information, determining information of a resource set used by the base station to send the initial information, where the determining information is used to indicate resource sets used by the base station to send the initial information, for example, the determining information may indicate a resource set 1, a resource set 2, and the like.

In this way, after obtaining, by parsing, the determining information, the terminal may determine, according to the determining information, the resource sets used by the base station to send the initial information.

Optionally, on the basis of the foregoing embodiments, in another optional embodiment of the information acquiring method according to an embodiment of the present invention, the method may further include:

determining, according to the resource set used to send the initial information, a resource used to receive non-initial information, where the non-initial information is information that needs to be received after a terminal completes acquiring the initial information; and receiving the non-initial information by using the resource used to receive the non-initial information.

The non-initial information in this embodiment of the present invention may include but is not limited to at least one of information carried over a physical downlink control channel (PDCCH), information carried over an enhanced physical downlink control channel (EPDCCH), information carried over a physical downlink shared channel (PDSCH), and a channel state information-reference signal (CSI-RS).

A resource used to send the initial information can be determined according to the resource set used to send the initial information. A resource used to receive the non-initial information can be determined by excluding, from all resources, the resource used by the initial information. The non-initial information is received by using the determined resource used to receive the non-initial information.

In the prior art, coverage enhancement capabilities of base stations are different, or coverage enhancement requirements that the base stations are required to support are different. Therefore, intensities of system information sent by base stations that provide different coverage enhancement are different. For example, quantities of times initial information is repeatedly sent are different, and therefore when receiving the initial information, a terminal cannot make sure how many times the base stations have repeatedly sent the system information. In this case, when the terminal subsequently receives non-initial information, because the initial information and the non-initial information may appear at a same frequency-domain resource position, and the terminal cannot determine how many time-frequency resources are used by the base stations, or which time-frequency resources are used to send the system information, the terminal cannot correctly receive the non-initial information sent by the base stations.

However, the method according to this embodiment of the present invention may determine a resource used by a base station to send a non-broadcast signal, so that the terminal can correctly receive the non-broadcast signal, thereby ensuring normal communication between the terminal and the base station.

Optionally, on the basis of the foregoing embodiments, in another optional embodiment of the information acquiring method according to an embodiment of the present invention, the determining, according to the resource set used to send the initial information, a resource used to receive non-initial information may include:

excluding resources indicated by all resource sets used to send the initial information, and determining a remaining resource obtained after the exclusion as a resource used to receive the non-initial information.

In this embodiment of the present invention, when no determining information exists in the initial information, the terminal may exclude resources indicated by all resource sets used to send the initial information, and determine a remaining resource obtained after the exclusion as a resource used to receive the non-initial information.

Optionally, on the basis of the foregoing embodiments, in another optional embodiment of the information acquiring method according to an embodiment of the present invention, the determining, according to the resource set used to send the initial information, a resource used to receive non-initial information may include:

excluding a resource indicated by the resource set indicated by the determining information, and determining a remaining resource obtained after the exclusion as a resource used to receive the non-initial information.

In this embodiment of the present invention, when determining information exists in the initial information, the terminal may determine, directly according to a resource indicated by a resource set indicated by the determining information, a remaining resource obtained after the exclusion as a resource used to receive the non-initial information.

Optionally, on the basis of the foregoing embodiments, in another optional embodiment of the information acquiring method according to an embodiment of the present invention, the receiving the non-initial information by using the resource used to receive the non-initial information may include:

receiving the non-initial information by using the remaining resource according to a puncturing algorithm or a rate matching algorithm.

Both the puncturing algorithm and the rate matching algorithm are commonly used methods in the field, which are not described in detail herein.

Optionally, on the basis of the foregoing embodiments, in another optional embodiment of the information acquiring method according to an embodiment of the present invention, each resource set of the at least one resource set includes indication information of at least one of a time-domain resource and a frequency-domain resource that carry the initial information.

A resource in this embodiment of the present invention may be a time-domain resource and a frequency-domain resource, and the indication information of a resource included in a resource set may be indication information of at least one of a time-domain resource and a frequency-domain resource.

Optionally, on the basis of the foregoing embodiments, in another optional embodiment of the information acquiring method according to an embodiment of the present invention, each resource set includes indication information of at least one of a time-domain resource and a frequency-domain resource that are of a preset quantity and at a preset position, and resources indicated by the at least one resource set do not overlap, or partially overlap.

In this embodiment of the present invention, a quantity of resources included in each resource set may be preset. For example, a resource set 1 includes identifiers of two radio frames, where the identifier of a first radio frame corresponds to identifiers of subframes 1 and 2, and the identifier of a second radio frame corresponds to identifiers of subframes 3 and 4; and a resource set 2 includes an identifier of one radio frame, where the identifier of the radio frame corresponds to identifiers of subframes 5, 6, and 7.

Optionally, on the basis of the foregoing embodiments, in another optional embodiment of the information acquiring method according to an embodiment of the present invention, each resource set includes indication information of at least one of a time-domain resource and a frequency-domain resource that are of a same quantity and at a preset position, and resources indicated by the at least one resource set do not overlap, or partially overlap.

In this embodiment of the present invention, resources included in each resource set are of a same quantity. For example, a resource set 1 includes identifiers of two radio frames, where the identifier of a first radio frame corresponds to identifiers of subframes 1 and 2, and the identifier of a second radio frame corresponds to identifiers of subframes 3 and 4; and a resource set 2 includes identifiers of two radio frames, where the identifier of a first radio frame corresponds to identifiers of subframes 5 and 6, and the identifier of a second radio frame corresponds to identifiers of subframes 7 and 8.

Optionally, on the basis of the foregoing embodiments, in another optional embodiment of the information acquiring method according to an embodiment of the present invention, the resources indicated by the at least one resource set are in an inclusion relationship, and after the at least one resource set is sorted in ascending order of a quantity of indicated resources, resources indicated by a current resource set always include all resources indicated by a previous resource set.

In this embodiment of the present invention, when there are five resource sets Rset1, Rset2, Rset3, Rset4, and Rset5, and an order is still Rset1, Rset2, Rset3, Rset4, and Rset5 after the resource sets are sorted in ascending order of a quantity of resources indicated by each resource set, resources indicated by Rset2 include all resources indicated by Rset1, resources indicated by Rset3 include all the resources indicated by Rset2, resources indicated by Rset4 include all the resources indicated by Rset3, and resources indicated by Rset5 include all the resources indicated by Rset4.

Optionally, on the basis of the foregoing embodiments, in another optional embodiment of the information acquiring method according to an embodiment of the present invention, when each resource set of the at least one resource set indicates that resource elements (RE) that carry the initial information are of a same quantity and at same positions in radio frames of each resource set, the acquiring initial information according to at least one preset resource set may include:

acquiring the initial information by using the resource elements REs that are of the same quantity and at the same positions in the radio frames of each resource set.

In this embodiment of the present invention, a resource element may be a subframe.

Being of a same quantity and at same positions in radio frames of each resource set may be understood as: resources indicated by a resource set 1 include a first subframe and a second subframe of a first radio frame, and if resource sets are in an inclusion relationship, resources indicated by a resource set 2 include not only the resources indicated by the resource set 1, but also a first subframe and a second subframe of a second radio frame. Here, resources included in both the first radio frame and the second radio frame are the first subframe and the second subframe.

On a base station side, another embodiment of the information acquiring method according to an embodiment of the present invention includes:

sending initial information according to at least one preset resource set, where the at least one resource set is used to indicate a resource used to send the initial information.

In this embodiment of the present invention, the resource set may include indication information of a resource used to transmit information between a base station and a terminal, so that the terminal may receive the initial information by using a resource indicated by the resource set.

The initial information in this embodiment of the present invention is information necessary for accessing a network to perform communication, and the initial information may include but is not limited to at least one of a master information block (MIB) carried over a physical broadcast channel PBCH, and a system information block (SIB).

In this embodiment of the present invention, initial information is sent according to at least one preset resource set, where the at least one resource set is used to indicate a resource used to send the initial information. Compared with the prior art, where a base station can send system information only by using a widest scope of resources, the information acquiring method provided in this embodiment of the present invention enables a base station to send, according to a requirement of the terminal, initial information by using a resource indicated by a corresponding resource set, thereby improving a resource utilization rate of the terminal.

Figure 2:
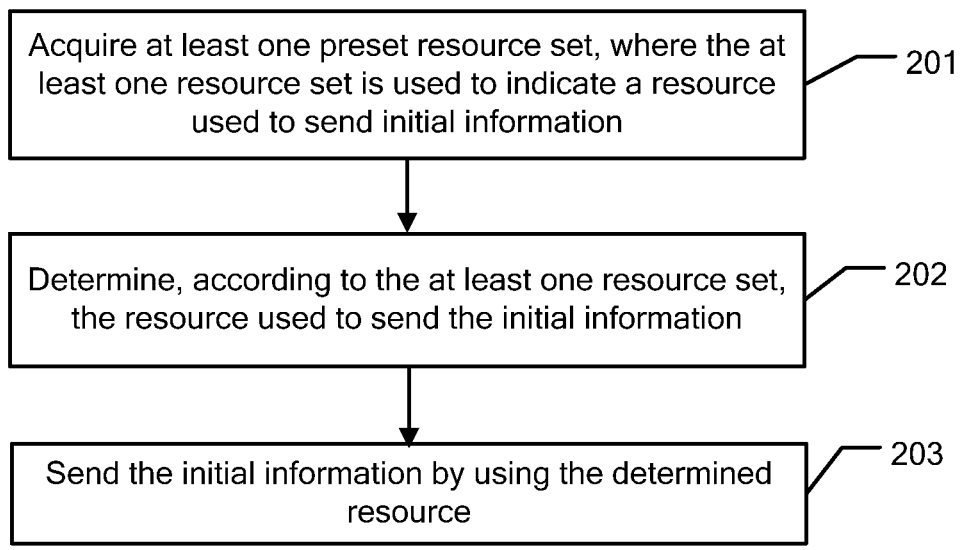
FIG. 2 is a schematic diagram of an information acquiring method according to another embodiment of the present invention.

Referring to FIG. 2, in another optional embodiment of the information acquiring method according to an embodiment of the present invention, a process of the sending initial information according to at least one preset resource set may include:

201. Acquire the at least one preset resource set, where the at least one resource set is used to indicate a resource used to send the initial information.

A process of the acquiring the at least one resource set may be reading or searching for the at least one preset resource set.

202. Determine, according to the at least one resource set, the resource used to send the initial information.

A resource set may include indication information of a corresponding resource. For example, when there are two resource sets, a resource set 1 includes identifiers of subframes 1 and 2 of a first radio frame, and a resource set 2 includes the identifiers of the subframes 1 and 2 of the first radio frame and identifiers of subframes 1 and 2 of a second radio frame. In this case, it can be determined that the resources used to send the initial information are the subframes 1 and 2 of the first radio frame and the subframes 1 and 2 of the second radio frame.

Certainly, only an example is illustrated here, and actually, there may be multiple resource sets, and there may also be multiple types of indication information of resources included in the resource sets. No specific limitation is imposed in this embodiment of the present invention.

203. Send the initial information by using the determined resource.

In this embodiment of the present invention, the base station may send, according to a requirement of a terminal, the initial information by using the resource indicated by the corresponding resource set, thereby improving a resource utilization rate of the terminal.

Optionally, on the basis of the foregoing embodiment of the base station side, in another optional embodiment of the information acquiring method according to an embodiment of the present invention, determining information of a resource set used to send the initial information is included in the initial information, so that a terminal determines, according to the determining information, a resource set used by a base station to send the initial information.

In this embodiment of the present invention, when sending the initial information, the base station may include, in the initial information, determining information of a resource set used by the base station to send the initial information, where the determining information is used to indicate resource sets used by the base station to send the initial information, for example, the determining information may indicate a resource set 1, a resource set 2, and the like.

In this way, after obtaining, by parsing, the determining information, the terminal may determine, according to the determining information, the resource sets used by the base station to send the initial information.

Optionally, on the basis of the foregoing embodiment of the base station side, in another optional embodiment of the information acquiring method according to an embodiment of the present invention, the method may further include:

determining, according to the resource set used to send the initial information, a resource used to send non-initial information, where the non-initial information is information that needs to be sent after the initial information is sent; and sending the non-initial information by using the resource used to send the non-initial information.

The non-initial information in this embodiment of the present invention may include but is not limited to at least one of information carried over a physical downlink control channel (PDCCH), information carried over an enhanced physical downlink control channel (EPDCCH), information carried over a physical downlink shared channel (PDSCH), and a channel state information-reference signal (CSI-RS).

According to the resource set used to send the initial information, a resource used to send the initial information can be determined. A resource used to send the non-initial information can be determined by excluding, from all resources, the resource used by the initial information, and the non-initial information is sent by using the resource used to send the non-initial information.

Optionally, on the basis of the foregoing embodiment of the base station side, in another optional embodiment of the information acquiring method according to an embodiment of the present invention, the determining, according to the resource set used to send the initial information, a resource used to send non-initial information may include:

excluding resources indicated by all resource sets used to send the initial information, and determining a remaining resource obtained after the exclusion as a resource used to send the non-initial information.

In this embodiment of the present invention, when no determining information exists in the initial information, the base station may exclude resources indicated by all resource sets used to send the initial information, and determine a remaining resource obtained after the exclusion as a resource used to send the non-initial information.

Optionally, on the basis of the foregoing embodiment of the base station side, in another optional embodiment of the information acquiring method according to an embodiment of the present invention, the determining, according to the resource set used to send the initial information, a resource used to send non-initial information may include:

excluding a resource indicated by the resource set indicated by the determining information, and determining a remaining resource obtained after the exclusion as a resource used to send the non-initial information.

In this embodiment of the present invention, when determining information exists in the initial information, the terminal may determine, directly according to a resource indicated by a resource set indicated by the determining information, a remaining resource obtained after the exclusion as a resource used to send the non-initial information.

Optionally, on the basis of the foregoing embodiment of the base station side, in another optional embodiment of the information acquiring method according to an embodiment of the present invention, the sending the non-initial information by using the resource used to send the non-initial information may include:

sending, according to a puncturing algorithm or a rate matching algorithm, the non-initial information by using the resource used to send the non-initial information.

Both the puncturing algorithm and the rate matching algorithm are commonly used methods in the field, which are not described in detail herein.

Optionally, on the basis of the foregoing embodiment of the base station side, in another optional embodiment of the information acquiring method according to an embodiment of the present invention, each resource set of the at least one resource set includes indication information of at least one of a time-domain resource and a frequency-domain resource that carry the initial information.

A resource in this embodiment of the present invention may be a time-domain resource and a frequency-domain resource, and the indication information of a resource included in a resource set may be indication information of at least one of a time-domain resource and a frequency-domain resource.

Optionally, on the basis of the foregoing embodiment of the base station side, in another optional embodiment of the information acquiring method according to an embodiment of the present invention, each resource set includes indication information of at least one of a time-domain resource and a frequency-domain resource that are of a preset quantity and at a preset position, and resources indicated by the at least one resource set do not overlap, or partially overlap.

In this embodiment of the present invention, a quantity of resources included in each resource set may be preset. For example, a resource set 1 includes identifiers of two radio frames, where the identifier of a first radio frame corresponds to identifiers of subframes 1 and 2, and the identifier of a second radio frame corresponds to identifiers of subframes 3 and 4; and a resource set 2 includes an identifier of one radio frame, where the identifier of the radio frame corresponds to identifiers of subframes 5, 6, and 7.

Optionally, on the basis of the foregoing embodiment of the base station side, in another optional embodiment of the information acquiring method according to an embodiment of the present invention, each resource set includes indication information of at least one of a time-domain resource and a frequency-domain resource that are of a same quantity and at a preset position, and resources indicated by the at least one resource set do not overlap, or partially overlap.

In this embodiment of the present invention, resources included in each resource set are of a same quantity. For example, a resource set 1 includes identifiers of two radio frames, where the identifier of a first radio frame corresponds to identifiers of subframes 1 and 2, and the identifier of a second radio frame corresponds to identifiers of subframes 3 and 4; and a resource set 2 includes identifiers of two radio frames, where the identifier of a first radio frame corresponds to identifiers of subframes 5 and 6, and the identifier of a second radio frame corresponds to identifiers of subframes 7 and 8.

Optionally, on the basis of the foregoing embodiment of the base station side, in another optional embodiment of the information acquiring method according to an embodiment of the present invention, the resources indicated by the at least one resource set are in an inclusion relationship, and after the at least one resource set is sorted in ascending order of a quantity of indicated resources, resources indicated by a current resource set always include all resources indicated by a previous resource set.

In this embodiment of the present invention, when there are five resource sets Rset1, Rset2, Rset3, Rset4, and Rset5, and an order is still Rset1, Rset2, Rset3, Rset4, and Rset5 after the resource sets are sorted in ascending order of a quantity of resources indicated by each resource set, resources indicated by Rset2 include all resources indicated by Rset1, resources indicated by Rset3 include all the resources indicated by Rset2, resources indicated by Rset4 include all the resources indicated by Rset3, and resources indicated by Rset5 include all the resources indicated by Rset4.

Optionally, on the basis of the foregoing embodiment of the base station side, in another optional embodiment of the information acquiring method according to an embodiment of the present invention, when each resource set of the at least one resource set indicates that resource elements REs that carry the initial information are of a same quantity and at same positions in radio frames of each resource set, the sending initial information according to at least one preset resource set includes: mapping the initial information to the resource elements REs that are of the same quantity and at the same positions in the radio frames of each resource set, and sending the initial information to the terminal.

In this embodiment of the present invention, a resource element may be a subframe.

Being of a same quantity and at same positions in radio frames of each resource set may be understood as: resources indicated by a resource set 1 include a first subframe and a second subframe of a first radio frame, and if resource sets are in an inclusion relationship, resources indicated by a resource set 2 include not only the resources indicated by the resource set 1, but also a first subframe and a second subframe of a second radio frame. Here, resources included in both the first radio frame and the second radio frame are the first subframe and the second subframe.

To facilitate understanding, the following uses a specific application scenario as an example to describe a process of information acquiring in this embodiment of the present invention.

A preset resource set in the base station and the terminal may be corresponding to a coverage enhancement level of the base station. For example, when coverage enhancement capabilities of the base station indicated by five coverage enhancement levels, that is, CIlevel1, CIlevel2, CIlevel3, CIlevel4, and CIlevel5, of the base station are respectively 0 dB, 5 dB, 10 dB, and 15 dB, the five levels may be respectively corresponding to the following resource sets: Rset1, Rset2, Rset3, Rset4, and Rset5, where resources indicated by Rset1, Rset2, Rset3, Rset4, and Rset5 may overlap, may not overlap, or may be in an inclusion relationship.

In this embodiment of the present invention, an example in which resources are in an inclusion relationship is used to describe a correspondence between a coverage enhancement level supported by a base station and a resource set.

The correspondence between the coverage enhancement level supported by the base station and the resource set may be:

Set0: a resource that the base station needs to occupy for sending initial information when coverage enhancement is not required, that is, the resource used to send the initial information when coverage enhancement of the base station is 0 dB;

Set1: An extra resource is added on the basis of the resources in the foregoing Set0, such as resources in subframes 0, 5, 1, and 6, which is corresponding to coverage enhancement of 5 dB;

Set2: An extra resource is added on the basis of the resources in the foregoing Set1, such as resources in subframes 2 and 7, which is corresponding to coverage enhancement of 10 dB;

Set3: An extra resource is added on the basis of the resources in the foregoing Set2, such as resources in subframes 3, 4, 8, and 9, which is corresponding to coverage enhancement of 15 dB.

The correspondence between the coverage enhancement level supported by the base station and the resource set may be:

Set0: a resource that the base station needs to occupy for sending initial information when coverage enhancement is not required, that is, the resource used to send the initial information when coverage enhancement of the base station is 0 dB;

Set1: all available resources of a first radio frame, which is corresponding to coverage enhancement of 5 dB;

Set2: all available resources of the first two radio frames, which is corresponding to coverage enhancement of 10 dB;

Set3: all available resources of the first four radio frames, which is corresponding to coverage enhancement of 15 dB.

The correspondence between the coverage enhancement level supported by the base station and the resource set may be:

Set0: a resource that the base station needs to occupy for sending initial information when coverage enhancement is not required, that is, the resource used to send the initial information when coverage enhancement of the base station is 0 dB;

Set1: some or all of available resources in a radio frame i (i=0, 1, 2, or 3), which is corresponding to coverage enhancement of 5 dB;

Set2: an extra resource added on the basis of the resources in the foregoing Set1, where the extra resource refers to some or all of remaining resources except resources corresponding to Set1 in the radio frame i (i=0, 1, 2, or 3), which is corresponding to coverage enhancement of 10 dB;

Set3: an extra resource added on the basis of the resources in the foregoing Set2, where the extra resource refers to some or all of remaining resources except resources corresponding to Set2 in the radio frame i (i=0, 1, 2, or 3), which is corresponding to coverage enhancement of 15 dB.

The foregoing provides only several specific correspondences between the coverage enhancement levels of the base station and the resource sets, which is not specifically limited in this embodiment of the present invention. Another resource set classification method may be used, and another coverage enhancement level may also exist.

A terminal according to an embodiment of the present invention includes:

a receiving unit, configured to acquire initial information according to at least one preset resource set, where the at least one resource set is used to indicate a resource used to acquire the initial information.

Figure 3:
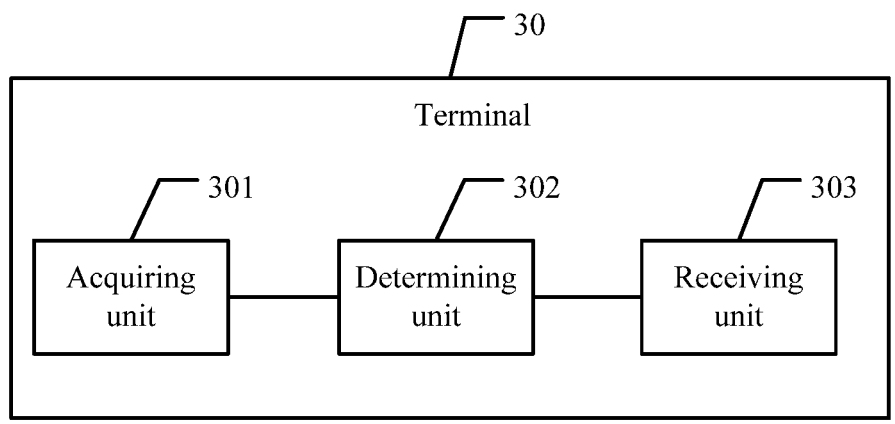
FIG. 3 is a schematic diagram of a terminal according to an embodiment of the present invention.

Referring to FIG. 3, another embodiment of the terminal according to the embodiment of the present invention includes:

an acquiring unit 301, configured to acquire at least one preset resource set, where the at least one resource set is used to indicate a resource used to acquire the initial information;

a determining unit 302, configured to determine, according to the at least one resource set acquired by the acquiring unit 301, the resource used to acquire the initial information; and a receiving unit 303, configured to receive the initial information by using the resource determined by the determining unit 302.

In this embodiment of the present invention, an acquiring unit 301 acquires at least one preset resource set, where the at least one resource set is used to indicate a resource used to receive initial information; a determining unit 302 determines, according to the at least one resource set acquired by the acquiring unit 301, the resource used to receive the initial information; and a receiving unit 303 receives the initial information by using the resource determined by the determining unit 302. Compared with the prior art, where a terminal can receive system information only by using a widest scope of resources, the terminal provided in the embodiment of the present invention may receive the initial information by using a preset resource set without a need to detect a widest scope of resources, thereby improving receiving efficiency of the terminal, and further reducing power consumption of the terminal.

Figure 4:
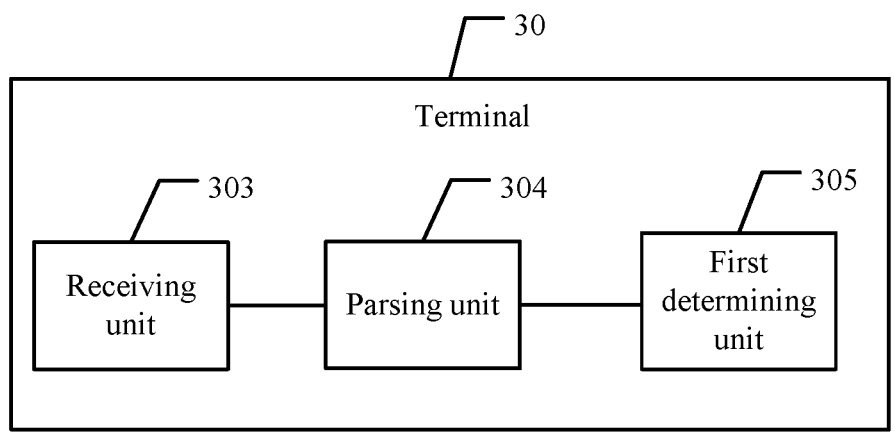
FIG. 4 is a schematic diagram of a terminal according to another embodiment of the present invention.

Optionally, referring to FIG. 4, on the basis of the foregoing terminal embodiment, in another embodiment of the terminal according to the embodiment of the present invention, the terminal 30 further includes:

a parsing unit 304, configured to parse the initial information; and a first determining unit 305, configured to: when the parsing unit 304 obtains, by parsing, determining information that is of a resource set used by a base station to send the initial information and that is included in the initial information, determine, according to the determining information, the resource set used by the base station to send the initial information.

Figure 5:
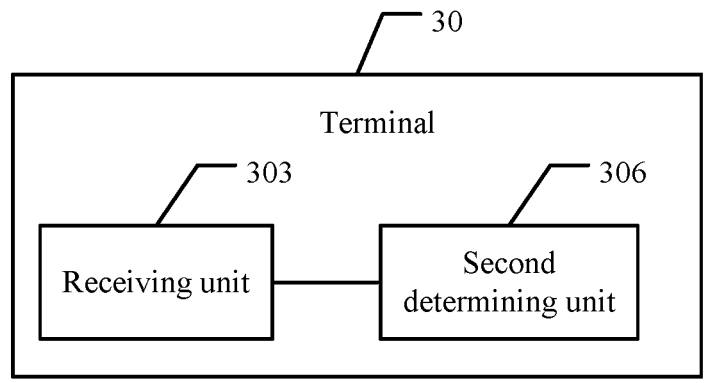
FIG. 5 is a schematic diagram of a terminal according to another embodiment of the present invention.

Optionally, referring to FIG. 5, on the basis of the foregoing terminal embodiment, in another embodiment of the terminal according to the embodiment of the present invention, the terminal 30 further includes:

a second determining unit 306, configured to determine, according to the resource set used to send the initial information, a resource used to receive non-initial information, where the non-initial information is information that needs to be received after the terminal completes acquiring the initial information; and the receiving unit 303 is further configured to receive the non-initial information by using the resource used to receive the non-initial information.

Optionally, on the basis of the embodiment corresponding to FIG. 5, in another embodiment of the terminal according to the embodiment of the present invention, the second determining unit 306 is configured to exclude resources indicated by all resource sets used to send the initial information, and determine a remaining resource obtained after the exclusion as a resource used to receive the non-initial information.

Optionally, on the basis of the embodiment corresponding to FIG. 5, in another embodiment of the terminal according to the embodiment of the present invention, the second determining unit 306 is configured to exclude a resource indicated by the resource set indicated by the determining information, and determine a remaining resource obtained after the exclusion as a resource used to receive the non-initial information.

Optionally, on the basis of the embodiment corresponding to FIG. 5, in another embodiment of the terminal according to the embodiment of the present invention, the receiving unit 303 is configured to receive the non-initial information by using the remaining resource according to a puncturing algorithm or a rate matching algorithm.

Optionally, on the basis of the embodiment corresponding to FIG. 5, in another embodiment of the terminal according to the embodiment of the present invention, the receiving unit 303 is further configured to receive the initial information from resource elements REs that are of a same quantity and at same positions in radio frames of each resource set.

A base station according to an embodiment of the present invention includes:

a sending unit, configured to send initial information according to at least one preset resource set, where the at least one resource set is used to indicate a resource used to send the initial information.

Figure 6:
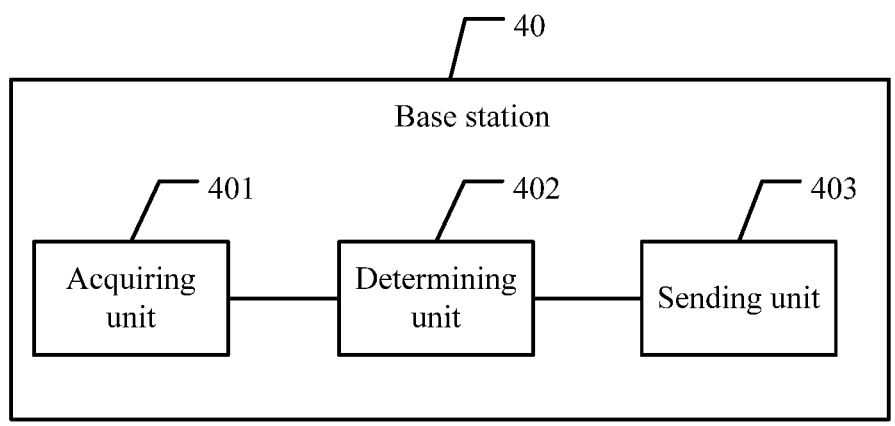
FIG. 6 is a schematic diagram of a base station according to an embodiment of the present invention.

Referring to FIG. 6, another embodiment of the base station according to the embodiment of the present invention includes:

an acquiring unit 401, configured to acquire at least one preset resource set, where the at least one resource set is used to indicate a resource used to send the initial information;

a determining unit 402, configured to determine, according to the at least one resource set acquired by the acquiring unit 401, the resource used to send the initial information; and a sending unit 403, configured to send the initial information by using the resource determined by the determining unit 402.

In this embodiment of the present invention, an acquiring unit 401 acquires at least one preset resource set, where the at least one resource set is used to indicate a resource used to send initial information; a determining unit 402 determines, according to the at least one resource set acquired by the acquiring unit 401, the resource used to send the initial information; and a sending unit 403 sends the initial information by using the resource determined by the determining unit. Compared with the prior art, where a base station can send system information only by using a widest scope of resources, the base station provided in the embodiment of the present invention may send, according to a requirement of the terminal, initial information by using a resource indicated by a corresponding resource set, thereby improving a resource utilization rate of the terminal.

On the basis of the foregoing embodiment corresponding to FIG. 6, in another embodiment of the base station according to the embodiment of the present invention, the determining unit 402 is configured to determine, according to the resource set used to send the initial information, a resource used to send non-initial information, where the non-initial information is information that needs to be sent after the initial information is sent; and the sending unit 403 is further configured to send the non-initial information by using the resource that is used to send the non-initial information and determined by the determining unit 402.

On the basis of the foregoing embodiments, in another embodiment of the base station according to the embodiment of the present invention, the determining unit 402 is configured to exclude resources indicated by all resource sets used to send the initial information, and determine a remaining resource obtained after the exclusion as a resource used to send the non-initial information.

On the basis of the foregoing embodiments, in another embodiment of the base station according to the embodiment of the present invention, the determining unit 402 is configured to exclude a resource indicated by a resource set indicated by determining information, and determine a remaining resource obtained after the exclusion as a resource used to send the non-initial information.

On the basis of the foregoing embodiments, in another embodiment of the base station according to the embodiment of the present invention, the sending unit 403 is configured to send, according to a puncturing algorithm or a rate matching algorithm, the non-initial information by using the resource used to send the non-initial information.

On the basis of the foregoing embodiments, in another embodiment of the base station according to the embodiment of the present invention, the sending unit 403 is configured to map the initial information to resource elements REs that are of a same quantity and at same positions in radio frames of each resource set, and send the initial information to a terminal.

An embodiment of the present invention further provides a computer storage medium, where the computer storage medium stores a program. When the program runs, some or all of the steps of the foregoing information acquiring method on the terminal side are performed.

An embodiment of the present invention further provides a computer storage medium, where the computer storage medium stores a program. When the program runs, some or all of the steps of the foregoing information acquiring method on the base station side are performed.

Figure 7:
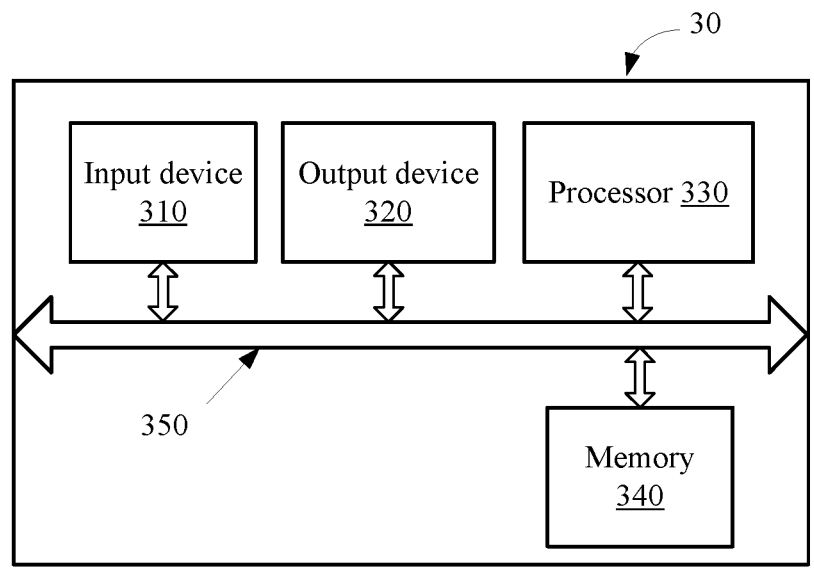
FIG. 7 is a schematic diagram of a terminal according to another embodiment of the present invention.

FIG. 7 is a schematic diagram of a structure of a terminal 30 according to an embodiment of the present invention. The terminal 30 may include an input device 310, an output device 320, a processor 330, and a memory 340.

The memory 340 may include a read-only memory and a random access memory, and provide an instruction and data for the processor 330. A part of the memory 340 may further include a non-volatile random access memory (NVRAM).

The memory 340 stores the following elements, an executable module or a data structure, or a subset thereof, or an extended set thereof:

an operating instruction: including various operating instructions, which are used to implement various operations; and an operating system: including various system programs, which are used to implement various basic services and process a hardware-based task.

In this embodiment of the present invention, the processor 330 performs the following operation by invoking an operating instruction stored in the memory 340 (the operating instruction may be stored in the operating system):

receiving, according to at least one preset resource set, initial information by using the input device 310, where the at least one resource set is used to indicate a resource used to receive the initial information.

Optionally, the processor 330 acquires the at least one preset resource set, where the at least one resource set is used to indicate the resource used to receive the initial information; determines, according to the at least one resource set, the resource used to receive the initial information; and uses the input device 310 to receive the initial information by using the determined resource.

In this embodiment of the present invention, a terminal may receive the initial information by using a preset resource set without a need to detect a widest scope of resources, thereby improving receiving efficiency of the terminal, and further reducing power consumption of the terminal.

The processor 330 controls an operation of the terminal 30, and the processor 330 may further be referred to as a CPU (Central Processing Unit). The memory 340 may include a read-only memory and a random access memory, and provide an instruction and data for the processor 330. A part of the memory 340 may further include a non-volatile random access memory (NVRAM). In a specific application, all components of the terminal 30 are coupled together by using a bus system 350, where the bus system 350 may further include a power bus, a control bus, a status information bus, and the like in addition to a data bus. However, for clarity of description, various buses are marked as the bus system 350 in the figure.

The methods disclosed in the foregoing embodiment of the present invention may be applied to the processor 330 or implemented by the processor 330. The processor 330 may be an integrated circuit chip and has an information processing capability. In an implementation process, the steps of the foregoing methods may be completed by using an integrated logic circuit of hardware in the processor 330 or an instruction in a form of software. The foregoing processor 330 may be a general purpose processor, a digital signal processor (DSP), an application-specific integrated circuit (ASIC), a field programmable gate array (FPGA) or another programmable logical device, discrete gate or transistor logical device, or a discrete hardware component, which may implement or execute the methods, the steps, and the logical block diagrams disclosed in the embodiments of the present invention. The general purpose processor may be a microprocessor, or the processor may be any conventional processor and the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 340. The processor 330 reads information from the memory 340, and completes the steps of the foregoing methods in combination with hardware of the processor 330.

Optionally, the processor 330 may further parse the initial information; and when determining information of a resource set used to send the initial information is included in the initial information, determine, according to the determining information, the resource set used by a base station to send the initial information.

Optionally, the processor 330 may further determine, according to the resource set used to send the initial information, a resource used to receive non-initial information, where the non-initial information is information that needs to be received after a terminal completes acquiring the initial information; and the input device 310 may further receive the non-initial information by using the resource used to receive the non-initial information.

Optionally, the processor 330 may specifically exclude resources indicated by all resource sets used to send the initial information, and determine a remaining resource obtained after the exclusion as a resource used to receive the non-initial information.

Optionally, the processor 330 may specifically exclude a resource indicated by the resource set indicated by the determining information, and determine a remaining resource obtained after the exclusion as a resource used to receive the non-initial information.

Optionally, the input device 310 may further specifically receive the non-initial information by using the remaining resource according to a puncturing algorithm or a rate matching algorithm.

Optionally, the initial information is information necessary for accessing a network to perform communication; and the initial information includes at least one of a master information block MIB carried over a physical broadcast channel PBCH, and a system information block SIB.

Optionally, the non-initial information includes at least one of information carried over a physical downlink control channel PDCCH, information carried over an enhanced physical downlink control channel EPDCCH, information carried over a physical downlink shared channel PDSCH, and a channel state information-reference signal CSI-RS.

Optionally, each resource set includes indication information of at least one of a time-domain resource and a frequency-domain resource that are of a preset quantity and at a preset position, and resources indicated by the at least one resource set do not overlap, or partially overlap.

Optionally, each resource set includes indication information of at least one of a time-domain resource and a frequency-domain resource that are of a same quantity and at a preset position, and resources indicated by the at least one resource set do not overlap, or partially overlap.

Optionally, the resources indicated by the at least one resource set are in an inclusion relationship, and after the at least one resource set is sorted in ascending order of a quantity of indicated resources, resources indicated by a current resource set always include all resources indicated by a previous resource set.

Optionally, when each resource set of the at least one resource set indicates that resource elements REs that carry the initial information are of a same quantity and at same positions in radio frames of each resource set, the input device 310 may further receive the initial information by using the resource elements REs that are of the same quantity and at the same positions in the radio frames of each resource set.

Figure 8:
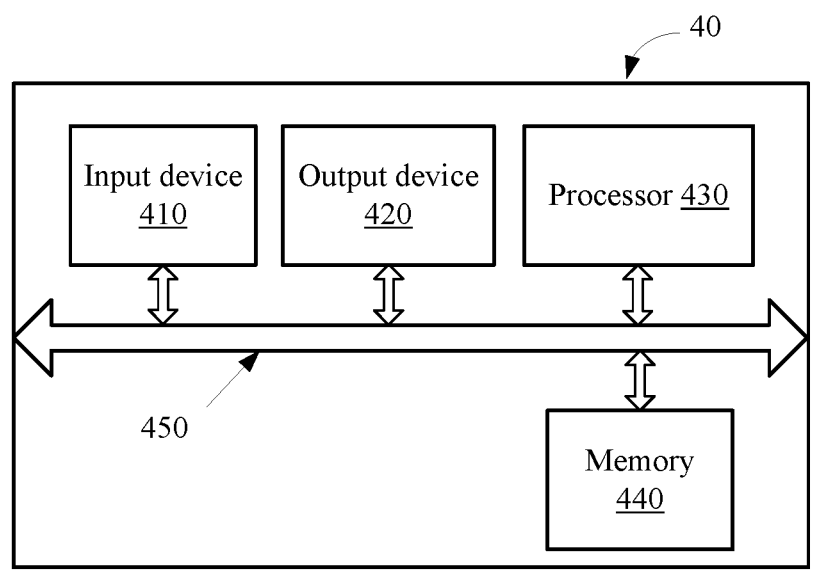
FIG. 8 is a schematic diagram of a base station according to another embodiment of the present invention.

FIG. 8 is a schematic diagram of a structure of a base station 40 according to an embodiment of the present invention. The base station 40 may include an input device 410, an output device 420, a processor 430, and a memory 440.

The memory 440 may include a read-only memory and a random access memory, and provide an instruction and data for the processor 430. A part of the memory 440 may further include a non-volatile random access memory (NVRAM).

The memory 440 stores the following elements, an executable module or a data structure, or a subset thereof, or an extended set thereof:

an operating instruction: including various operating instructions, which are used to implement various operations; and an operating system: including various system programs, which are used to implement various basic services and process a hardware-based task.

In this embodiment of the present invention, the processor 430 performs the following operation by invoking an operating instruction stored in the memory 440 (the operating instruction may be stored in the operating system):

sending, according to at least one preset resource set, initial information by using the output device 420, where the at least one resource set is used to indicate a resource used to send the initial information.

Optionally, the processor 430 acquires the at least one preset resource set, where the at least one resource set is used to indicate the resource used to receive the initial information; determines, according to the at least one resource set, the resource used to send the initial information; and uses the output device 420 to send the initial information by using the determined resource.

In this embodiment of the present invention, the base station may send the initial information by using the resource indicated by the resource set without a need to send the initial information by using a widest scope of resources, thereby improving a resource utilization rate of a terminal.

The processor 430 controls an operation of the base station 40, and the processor 430 may further be referred to as a CPU (Central Processing Unit). The memory 440 may include a read-only memory and a random access memory, and provide an instruction and data for the processor 430. A part of the memory 440 may further include a non-volatile random access memory (NVRAM). In a specific application, all components of the base station 40 are coupled together by using a bus system 450, where the bus system 450 may further include a power bus, a control bus, a status information bus, and the like in addition to a data bus. However, for clarity of description, various buses are marked as the bus system 450 in the figure.

The methods disclosed in the foregoing embodiment of the present invention may be applied to the processor 430 or implemented by the processor 430. The processor 430 may be an integrated circuit chip and has an information processing capability. In an implementation process, the steps of the foregoing methods may be completed by using an integrated logic circuit of hardware in the processor 430 or an instruction in a form of software. The foregoing processor 430 may be a general purpose processor, a digital signal processor (DSP), an application-specific integrated circuit (ASIC), a field programmable gate array (FPGA) or another programmable logical device, discrete gate or transistor logical device, or a discrete hardware component, which may implement or execute the methods, the steps, and the logical block diagrams disclosed in the embodiments of the present invention. The general purpose processor may be a microprocessor, or the processor may be any conventional processor and the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 440. The processor 430 reads information from the memory 440, and completes the steps of the foregoing methods in combination with hardware of the processor 430.

Optionally, determining information of a resource set used to send the initial information is included in the initial information, so that the terminal determines, according to the determining information, the resource set used by the base station to send the initial information.

Optionally, the processor 430 may further determine, according to the resource set used to send the initial information, a resource used to send non-initial information, where the non-initial information is information that needs to be sent after the initial information is sent; and the output device 420 may further send the non-initial information by using the resource used to send the non-initial information.

Optionally, the processor 430 may specifically exclude resources indicated by all resource sets used to send the initial information, and determine a remaining resource obtained after the exclusion as a resource used to send the non-initial information.

Optionally, the processor 430 may specifically exclude a resource indicated by the resource set indicated by the determining information, and determine a remaining resource obtained after the exclusion as a resource used to send the non-initial information.

Optionally, the input device 410 may further specifically send, according to a puncturing algorithm or a rate matching algorithm, the non-initial information by using the resource used to send the non-initial information.

Optionally, the initial information is information necessary for accessing a network to perform communication; and the initial information includes at least one of a master information block MIB carried over a physical broadcast channel PBCH, and a system information block SIB.

Optionally, the non-initial information includes at least one of information carried over a physical downlink control channel PDCCH, information carried over an enhanced physical downlink control channel EPDCCH, information carried over a physical downlink shared channel PDSCH, and a channel state information-reference signal CSI-RS.

Optionally, each resource set includes indication information of at least one of a time-domain resource and a frequency-domain resource that are of a preset quantity and at a preset position, and resources indicated by the at least one resource set do not overlap, or partially overlap.

Optionally, each resource set includes indication information of at least one of a time-domain resource and a frequency-domain resource that are of a same quantity and at a preset position, and resources indicated by the at least one resource set do not overlap, or partially overlap.

Optionally, the resources indicated by the at least one resource set are in an inclusion relationship, and after the at least one resource set is sorted in ascending order of a quantity of indicated resources, resources indicated by a current resource set always include all resources indicated by a previous resource set.

Optionally, when each resource set of the at least one resource set indicates that resource elements REs that carry the initial information are of a same quantity and at same positions in radio frames of each resource set, the output device 420 may further map the initial information to the resource elements REs that are of the same quantity and at the same positions in the radio frames of each resource set, and send the initial information to the terminal.

Figure 9:
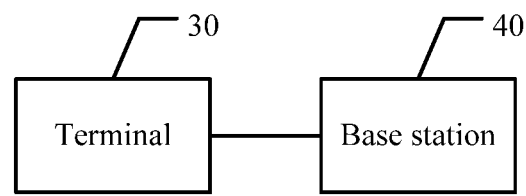
FIG. 9 is a schematic diagram of a communications system according to an embodiment of the present invention.

Referring to FIG. 9, an embodiment of a communications system according to an embodiment of the present invention includes: a terminal 30 and a base station 40.

The terminal 30 is configured to receive initial information according to at least one preset resource set, where the at least one resource set is used to indicate a resource used to receive the initial information.

The base station 40 is configured to send the initial information according to at least one preset resource set, where the at least one resource set is used to indicate a resource used to send the initial information.

A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, an optical disc, or the like.

The foregoing has described an information acquiring method, a terminal, and a system according to embodiments of the present invention in detail. Specific examples are used herein to describe the principles and implementation manners of the present invention. The description of the embodiments is merely intended to help understand the method of the present invention and core ideas thereof. In addition, a person of ordinary skill in the art can make various modifications and variations to the present invention with respect to specific implementation manners and application scopes according to the ideas of the present invention. In conclusion, the content of the specification shall not be construed as a limitation on the present invention.

What is claimed is:

1. An information acquiring method comprising:
  receiving indicating information, wherein the indicating information is used for indicating a resource set used by a base station to send initial information, the initial information comprising a master information block (MIB); and
  determining, a resource used for receiving non-initial information, according to the resource set indicated by the indicating information, the non-initial information comprising information carried over a physical downlink shared channel (PDSCH), wherein the resource used for receiving non-initial information does not overlap with the resource set indicated by the indicating information.

2. The method according to claim 1, further comprising:
  receiving the non-initial information by using the resource used for receiving non-initial information according to a rate matching algorithm.

3. The method according to claim 1, wherein the method further comprises:
  receiving the initial information according to the indicating information.

4. The method according to claim 1, wherein the method further comprises:
receiving the initial information by using the resource set indicated by the indicating information.

5. The method according to claim 1, wherein the indicating information is carried in a system information block (SIB).

6. A terminal comprising:
a receiver, configured to receive indicating information, wherein the indicating information is used for indicating a resource set used by a base station to send initial information, the initial information comprising a master information block (MIB);
a processor; and
a memory storing a program to be executed in the processor, the program comprising instructions to determine a resource used for receiving non-initial information, according to the resource set indicated by the indicating information, the non-initial information comprising information carried over a physical downlink shared channel (PDSCH), wherein the resource used for receiving non-initial information does not overlap with the resource set indicated by the indicating information.

7. The terminal according to claim 6, wherein:
the receiver is further configured to receive the non-initial information by using the resource for receiving non-initial information according to a rate matching algorithm.

8. The terminal according to claim 6, wherein
the receiver is further configured to receive the initial information according to the indicating information.

9. The terminal according to claim 6, wherein
the receiver is further configured to receive the initial information by using the resource sets indicated by the indicating information.

10. The terminal according to claim 6, wherein the indicating information is carried in a system information block (SIB).

11. A non-transitory storage medium, comprising instructions, which, when executed, cause a processor perform the following steps:
receiving indicating information, wherein the indicating information is used for indicating a resource set used by a base station to send initial information, the initial information comprises a master information block (MIB); and
determining, a resource used for receiving non-initial information, according to the resource set indicated by the indicating information, the non-initial information comprising information carried over a physical downlink shared channel (PDSCH), wherein the resource used for receiving non-initial information does not overlap with the resource set indicated by the indicating information.

12. The non-transitory storage medium according to claim 11, wherein the steps further comprises:
receiving the non-initial information by using the resource used for receiving non-initial information according to a rate matching algorithm.

13. The non-transitory storage medium according to claim 11, wherein the steps further comprises:
receiving the initial information by using the resource set indicated by the indicating information.

14. The non-transitory storage medium according to claim 11, wherein the indicating information is carried in a system information block (SIB).

* * * * *

UNITED STATES PATENT AND TRADEMARK OFFICE
CERTIFICATE OF CORRECTION

PATENT NO. : 10,548,120 B2
APPLICATION NO. : 15/068410
DATED : January 28, 2020
INVENTOR(S) : Jinhuan Xia Page 1 of 1

It is certified that error appears in the above-identified patent and that said Letters Patent is hereby corrected as shown below:

In Column 25, Line 29, Claim 7, delete "by using the resource for receiving" and insert --by using the resource used for receiving--.

Signed and Sealed this
Eighth Day of September, 2020

Andrei Iancu
*Director of the United States Patent and Trademark Office*